United States Patent
McAndrews

(10) Patent No.: US 6,630,750 B2
(45) Date of Patent: Oct. 7, 2003

(54) SPARE BUS POWER PLANT

(75) Inventor: Joseph M. McAndrews, Freeport, NY (US)

(73) Assignee: Jomahip, LLC, Harwinton, CT (US)

(*) Notice: Subject to any disclaimer, the term of this patent is extended or adjusted under 35 U.S.C. 154(b) by 392 days.

(21) Appl. No.: 09/738,008

(22) Filed: Dec. 15, 2000

(65) Prior Publication Data

US 2001/0024065 A1 Sep. 27, 2001

Related U.S. Application Data

(60) Provisional application No. 60/171,193, filed on Dec. 16, 1999.

(51) Int. Cl.$^7$ ................................................. H02J 9/00
(52) U.S. Cl. ............................................. 307/64; 363/69
(58) Field of Search ......................... 307/64, 66, 65; 363/44, 67, 69, 72

(56) References Cited

U.S. PATENT DOCUMENTS

| | | | | |
|---|---|---|---|---|
| 3,641,356 A | * | 2/1972 | Ekstrom | 307/64 |
| 4,451,773 A | * | 5/1984 | Papathomas et al. | 363/69 |
| 4,633,412 A | * | 12/1986 | Ebert et al. | 363/69 |
| 4,731,723 A | * | 3/1988 | Nogi et al. | 363/70 |
| 4,736,114 A | | 4/1988 | Reichl | 307/11 |
| 5,057,697 A | * | 10/1991 | Hammond et al. | 307/66 |
| 5,160,851 A | | 11/1992 | McAndrews | 307/66 |
| 5,198,698 A | | 3/1993 | Paul et al. | 307/64 |
| 5,319,536 A | * | 6/1994 | Malik | 363/65 |
| 5,332,927 A | | 7/1994 | Raul et al. | 307/66 |
| 5,406,470 A | * | 4/1995 | Ridley et al. | 363/69 |
| 5,494,561 A | * | 2/1996 | Darche et al. | 204/625 |
| 5,612,581 A | * | 3/1997 | Kageyama | 307/64 |
| 5,740,023 A | * | 4/1998 | Brooke et al. | 363/69 |
| 5,777,454 A | * | 7/1998 | McAndrews et al. | 307/66 |
| 5,796,182 A | * | 8/1998 | Martin | 307/66 |
| 5,917,250 A | * | 6/1999 | Kakalec et al. | 307/64 |
| 5,920,129 A | * | 7/1999 | Smith | 307/64 |
| 5,994,795 A | * | 11/1999 | Gabillet | 307/66 |
| 6,011,324 A | * | 1/2000 | Kohlstruck et al. | 307/64 |
| 6,040,640 A | * | 3/2000 | Gehre et al. | 307/66 |
| 6,115,276 A | | 9/2000 | Mao | 363/127 |
| 6,160,722 A | | 12/2000 | Thommes et al. | 363/37 |
| 6,184,593 B1 | | 2/2001 | Jungreis | 307/64 |
| 6,262,900 B1 | * | 7/2001 | Suntio | 363/69 |
| 6,278,624 B1 | * | 8/2001 | Nelson | 363/65 |
| 6,281,602 B1 | * | 8/2001 | Got et al. | 307/66 |
| 6,288,916 B1 | * | 9/2001 | Liu et al. | 307/66 |
| 6,304,006 B1 | * | 10/2001 | Jungreis | 307/64 |
| 6,304,059 B1 | * | 10/2001 | Chalasani et al. | 320/118 |
| 6,362,540 B1 | * | 3/2002 | Hill | 307/52 |
| 6,369,461 B1 | * | 4/2002 | Jungreis et al. | 307/66 |
| 6,452,289 B1 | * | 9/2002 | Lansberry et al. | 307/64 |
| 6,476,583 B2 | * | 11/2002 | McAndrews | 320/119 |
| 2002/0117899 A1 | * | 8/2002 | Seefried et al. | 307/64 |

FOREIGN PATENT DOCUMENTS

| | | | | |
|---|---|---|---|---|
| JP | 64-089967 | * | 4/1989 | H02M/7/155 |
| WO | WO 01/45230 | * | 6/2001 | H02J/7/00 |

* cited by examiner

Primary Examiner—Brian Sircus
Assistant Examiner—Roberto J. Rios
(74) Attorney, Agent, or Firm—St. Onge Steward Johnston & Reens LLC

(57) ABSTRACT

A DC power plant system is provided utilizing battery back up for emergency power for use with telephone switching equipment or other loads, whereby the system provides for a more efficient use of the DC rectifiers and allows a standby emergency power source to be sized to fit only the actual load rectifiers which will reduce the cost of the emergency standby power system.

17 Claims, 8 Drawing Sheets to provide for this one-time power drain, which occurs at most but occasionally.

In addition, the paralleling of all available rectifiers or rectified DC power sources forces them all to share and satisfy the initially high connected load leading to inefficient operation of the AC to DC conversion by the rectifiers. Therefore, the two main disadvantages of the current systems are:

1. Over subscribed kilowatt sizing for installed AC emergency generator power.
2. Less efficient operation of all rectified DC power sources.

SUMMARY OF THE INVENTION

This invention provides a system to improve the efficiency of the utilized DC rectifiers while still providing standby spare rectifiers that automatically come online in the event a load rectifier fails. In addition, because of the specific rectifier arrangement of the invention, the standby emergency power source can be reduced in size to satisfy the initial connected current flow from only the rectifiers connected to the load and back-up batteries rather than all the available rectifiers.

The invention achieves the improved system by segregating the available rectifiers into two groups. A first group of load rectifiers for delivering and satisfying normal charging operation of the back-up batteries and the load and a second group of spare rectifiers that serves as spares for selective connection to the system when one of the load rectifiers fails.

Both disadvantages are addressed by the invention in that the segregation of the load rectifiers from the spare rectifiers provides alternative options that allow the DC power plant to operate more efficiently by intentionally failing to provide sufficient DC power to satisfy the start-up current demands imposed by the parallel connected back-up batteries and the load and allowing an initial small amount of DC voltage drop to occur on the load bus. This condition lasts only briefly, but permits one to reduce the startup current to thus reduce the power capacity or sizing of the emergency generator, while enabling a spare rectifier to be activated to supply DC power when a load rectifier fails.

Segregating the load and spare DC power sources of the DC power plant thus makes more efficient use of the load rectifiers, and generates capital cost savings. The cost savings are realized by decreasing the size of the emergency power generator so as to cover only the current demanded by the load rectifiers, and not the spare rectifiers as are common in conventional systems.

Accordingly, it is the object of the invention to provide a system and method, which improves the operating efficiency of standby emergency DC power plant systems.

Another object of the invention is to provide a system and method, which lowers the costs associated with standby emergency AC generators used to provide power to DC power plant systems.

Another aspect of the invention comprises a method for more efficiently operating a DC power plant system utilizing battery back up and a standby emergency power source for use with telephone switching equipment or other loads.

The invention and its particular features and advantages will become more apparent from the following detailed description considered with reference to the accompanying drawings.

SPARE BUS POWER PLANT

PRIOR PATENT APPLICATION

Figure 1:
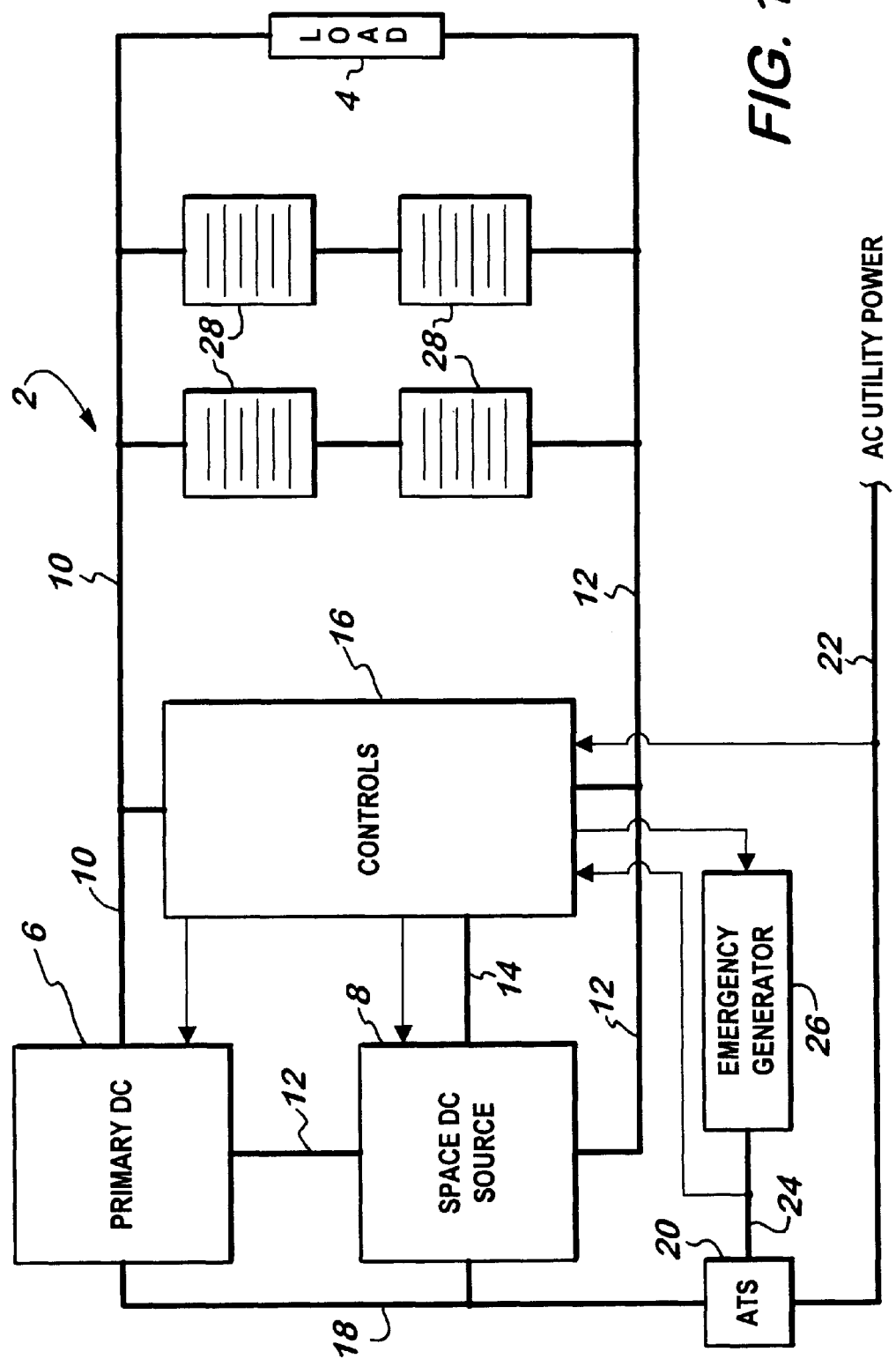
FIG. 1 is a block diagram illustrating an emergency DC power system in accordance with the invention.

This application claims the benefit of prior Provisional patent application Serial No. 60/171,193 filed on Dec. 16, 1999 all of which is incorporated herein by reference thereto.

FIELD OF THE INVENTION

This invention generally relates to a method and apparatus for providing an improved DC power plant system capable of delivering emergency DC power to telephone equipment or other loads. More specifically this invention relates to a DC power back-up system using AC driven rectifiers connected to charge back-up batteries and power DC telecom equipment.

BACKGROUND

In telephone switching equipment, communication and computer equipment, and in many other applications, the need for an uninterrupted source of DC power is critical. Rectified commercial AC power is typically used as the primary source of DC power for such equipment. The DC power from the rectifiers is delivered to the back-up batteries and the load through a load bus and returned to the rectifiers along a ground bus.

To avoid any interruption or outage in power service, it is common practice to employ a battery back-up system for the primary DC source. Back-up battery systems typically include strings of batteries or cells connected in parallel with the primary DC source and the load. Some systems are also equipped with AC generators to further back up the AC line power. In the event of a drop in the DC load bus voltage below a predetermined threshold, the back-up battery supplants or supplements the primary source of DC power. The battery back-up continues until either AC line power is resumed or the AC emergency generator is activated to supply AC power to the rectifiers. Back-up battery systems are designed to replace the primary DC power source for a predetermined period of time. Within that period of time, the resumption of primary AC line power is expected to occur.

In conventional back-up battery systems, the nominal system load bus voltage is typically dictated by battery characteristics. For example, in a telephone switching plant, back-up batteries are commonly employed which each have a design float charge cell voltage of 2.17 volts, for optimum health of the battery cell. Twenty-four cells are typically connected in series to form a string resulting in a nominal load bus voltage of approximately −52.10 volts. A bank of strings supplies the necessary back-up DC power.

When AC line power is initially turned on or AC emergency power is activated in place of the AC line power, the back-up batteries tend to draw an excessive amount of current since these are placed in parallel with the DC load. This design architecture of a typical back-up battery system presents a number of disadvantages. Partially or fully discharged batteries, due to their electrochemical constitution, will draw an excessive amount of current in order to recharge themselves as quickly as possible. All batteries, no matter the time spent on discharge, will initially demand a high amount of recharge current from the rectifiers or the primary DC power source. Consequently, upon the return of AC power to the rectifiers the initial current to recharge the batteries is must be counted as connected load. Emergency AC generators for use with central office DC power plants FIG. 2 is a more detailed schematic diagram of the emergency DC power system of FIG. 1.

Figure 2:
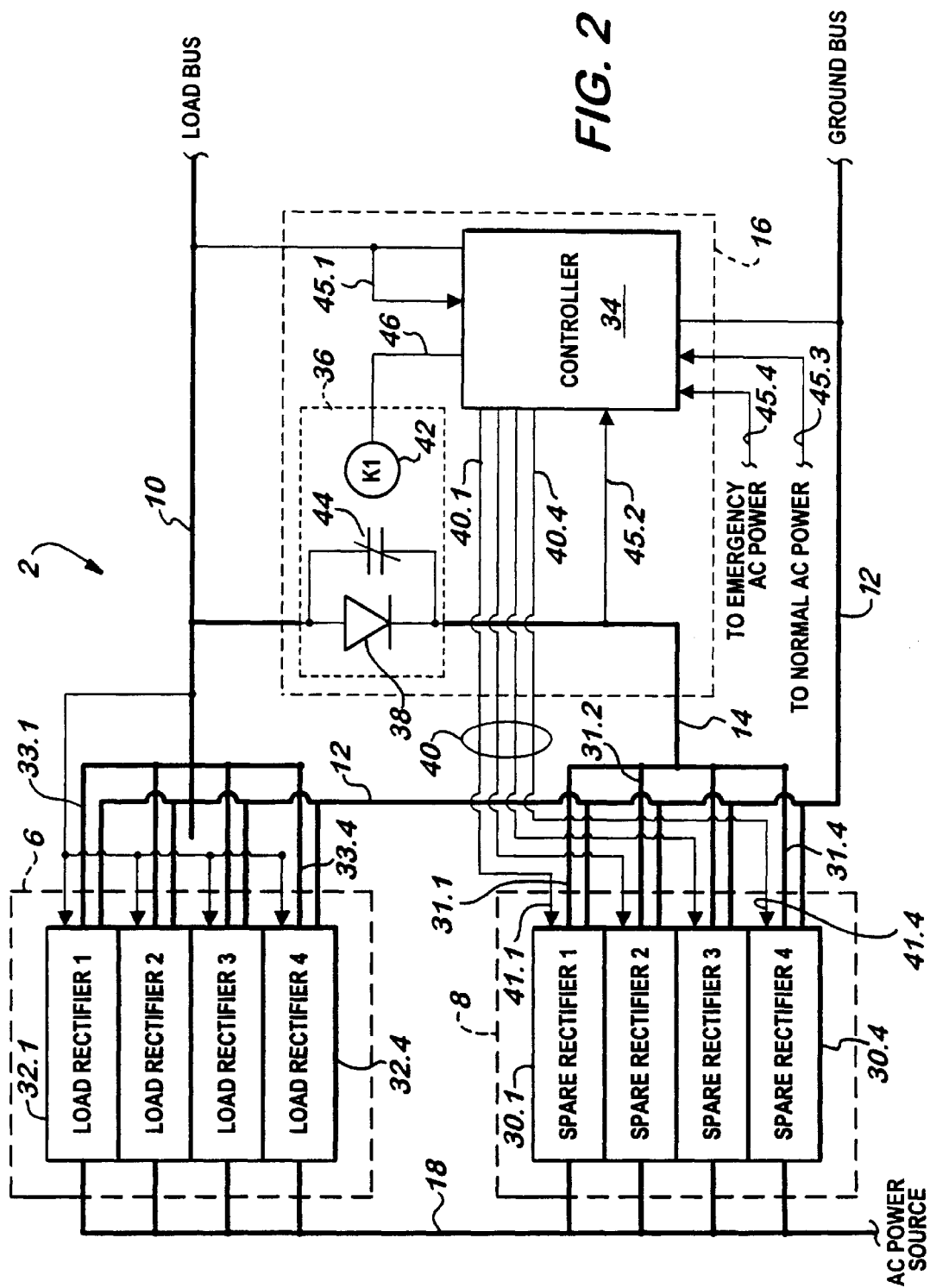
Figure 3:
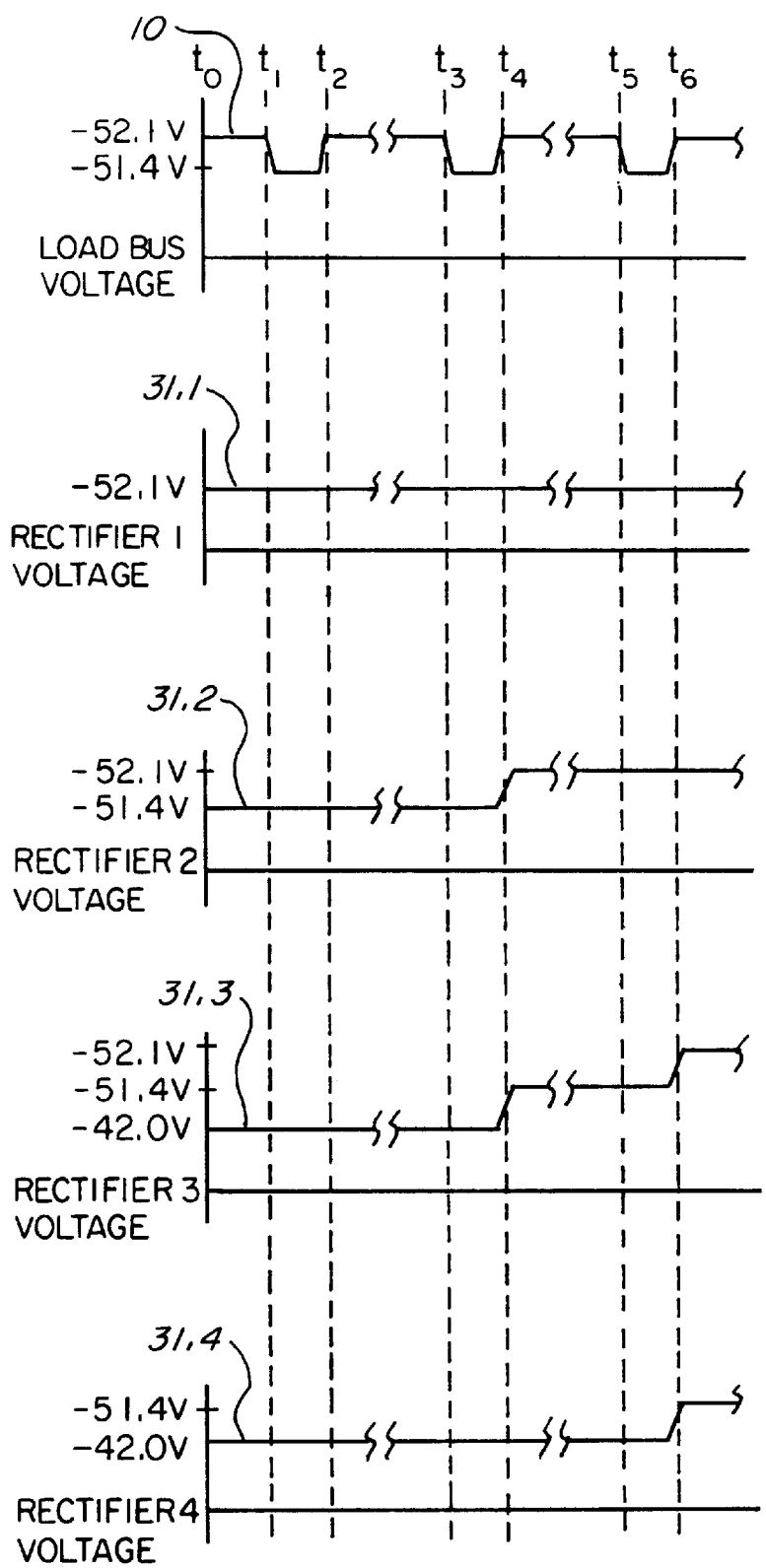

FIG. 3 is a timing diagram illustrating the output voltage of each spare rectifier, as adjusted by a controller used in the system of FIG. 1, in response to a change in the load bus voltage.

Figure 4:
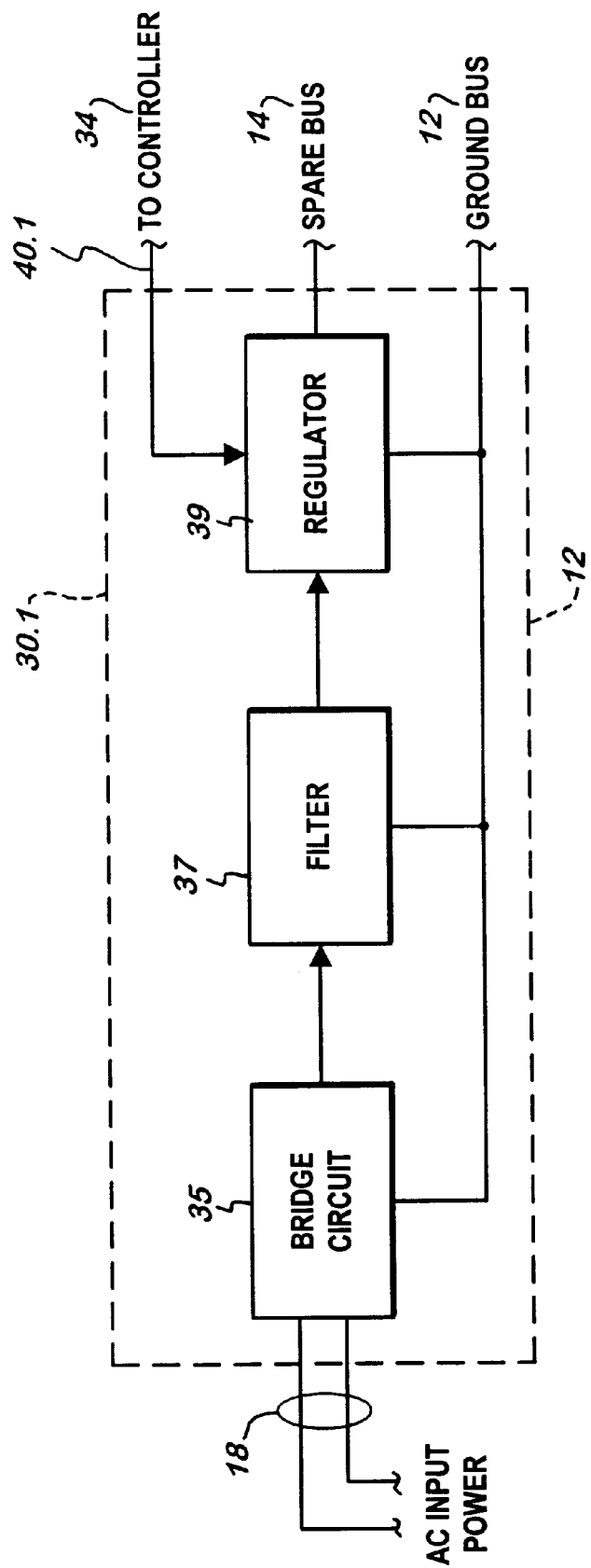

FIG. 4 is a block diagram illustrating a standard spare DC rectifier.

Figure 5A:
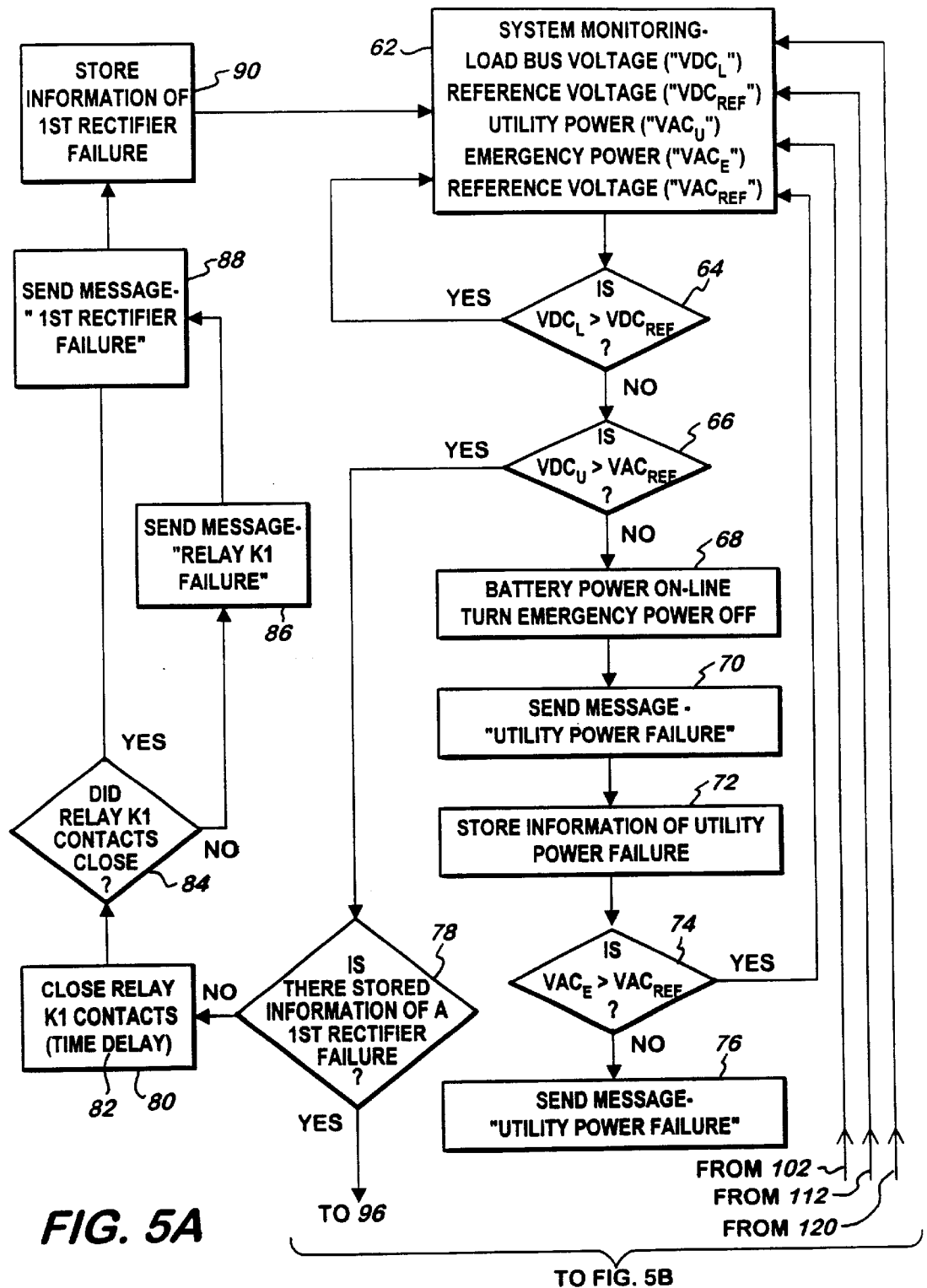

FIG. 5A is a flow diagram illustrating the operating sequence of the emergency DC power system of FIG. 1.

Figure 5B:
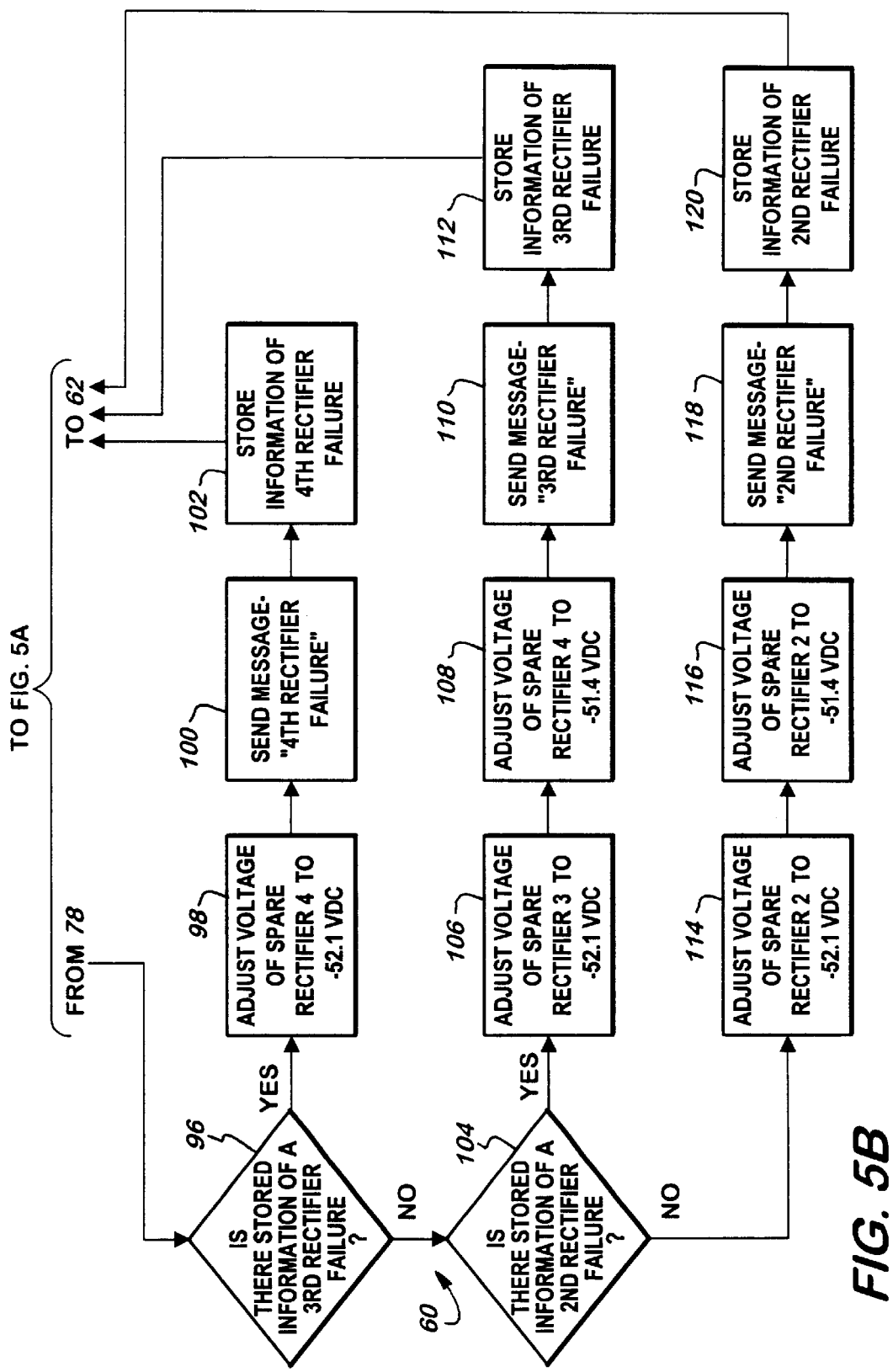

FIG. 5B is a continuation of the flow diagram of FIG. 5A.

Figure 6:
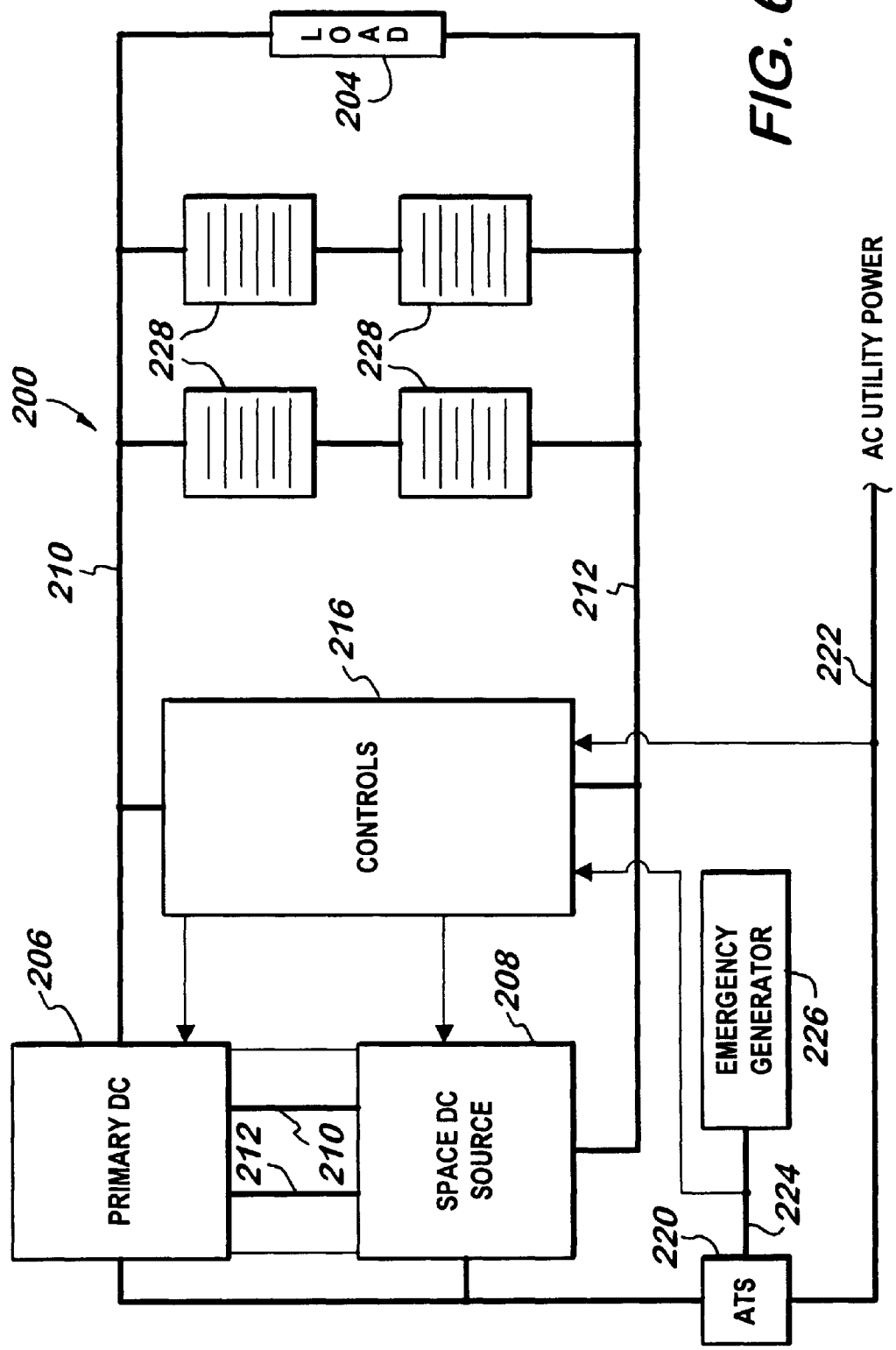

FIG. 6 is a block diagram illustrating an alternate embodiment of the emergency DC power system.

Figure 7:
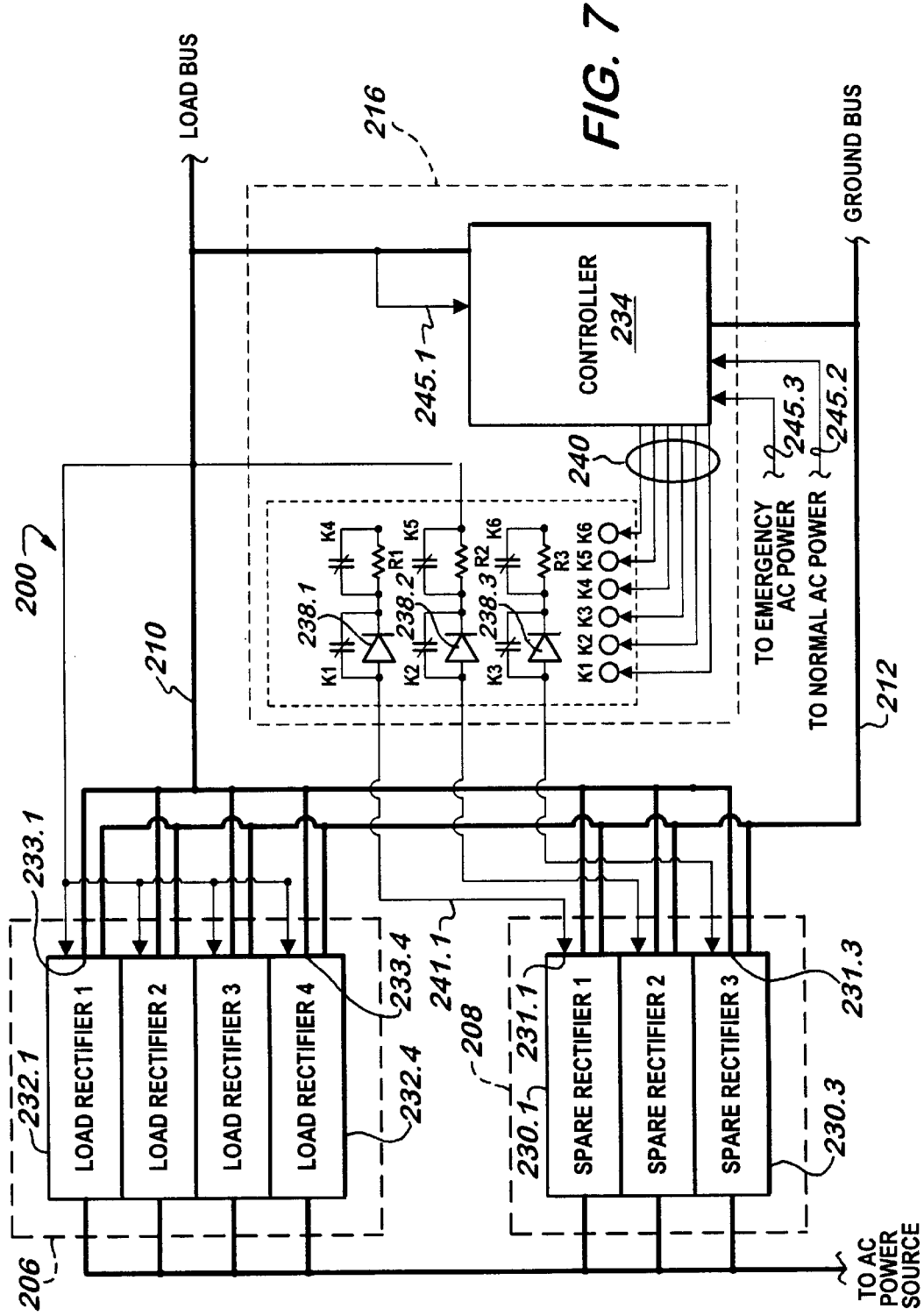

FIG. 7 is a schematic diagram of the power system illustrating the alternate embodiment of the emergency DC power system.

DETAILED DESCRIPTION OF THE INVENTION

With reference to FIG. 1 a system 2 for providing DC power to a system load 4 is shown. A primary DC source 6, using variable load rectifiers as illustrated in FIG. 2, is segregated from a spare DC source 8. The primary DC source 6 supplies DC power to system load 4 onto a load bus 10 and has a return path through ground bus 12. The spare DC source 8 delivers DC power onto a spare bus 14 through which load 4 supplemental current is provided in the event of a partial or complete failure in the primary DC source 6. A control 16 is provided to monitor the voltage on load bus 10, the AC line power 22, and the AC power on line 24 from an emergency source 26. A remotely controlled automatic transfer switch 20 enables automatic switching of AC power between the line source 22 and the emergency AC generator power on line 24.

The DC load bus 10 is also connected to a battery system 28, which provides DC power to the load 4 at least for such time as the emergency standby AC power generator 26 requires for start up and the automatic transfer switch 20 can switch to the emergency AC power on line 24. Normally, the batteries are sized to provide DC power for a much longer interval.

The spare bus 14 is connected to the load bus 10 through the control 16 in the event of a failure within the primary DC source 6. The primary DC source 6 is sized so as to provide the required DC voltage for the load bus throughout the normal current loads imposed by the load 4 and a charging of batteries 28. As a result when an emergency arises, such as when there is partial failure within the DC source 6, and an insufficient amount of DC power is available for the load, the DC source becomes more heavily loaded and its output voltage on load bus 10 drops. When the load bus 10 voltage drops approximately 0.7 volts, the diode 38 allows the power on the spare bus 14 to be instantly available to the load bus 10. This 0.7-volt drop is sensed by control 16, which then energizes relay or contactor 44. This directly connects the spare bus 14 and the load bus 10 together and eliminates the 0.7 volt drop caused by the diode 38.

When control 16 senses a failure in the available line voltage on line 22, DC power from the batteries 28 drives the load 4. The loss of AC line power causes the emergency generator 26 to be activated either by control 26 or manually. The initial current surge demanded by the batteries 28 when the generator 26 comes on line is limited by the available current from the load source 6. Since this current capacity has a predetermined limit the emergency standby AC power generator 22 can be sized to feed this limit and thus satisfy only the primary DC source 6, rather that both the primary DC source 6 and the spare DC source 8.

FIG. 2 depicts interconnections of the primary DC source 6, the spare DC source 8, and the control 16. The primary DC source 6 and the spare DC source 8 are each formed of a plurality of parallel connected conventional rectifiers 32 and 30 respectively. FIG. 4 is illustrative of one such rectifier 30.1 and includes a full wave bridge circuit 35, a filter 37 and a regulator 39. As shown in FIG. 2 the outputs 31.1–31.4 of spare rectifiers 30.1–30.4 are all connected to common spare bus 14. Once a spare rectifier 30 is activated, such as by raising the magnitude of its output voltage, the spare rectifier 30 will supply power to the load 4 as needed.

The load rectifiers 32.1–32.4 have their outputs 33.1–33.4 connected to load bus 10. Current from the spare rectifiers 30 is supplied to load bus 10 through a blocking circuit 36 composed of a diode 38 in parallel with a shorting switch 44 actuated by a relay 42. The relay 42 is controlled with signals on line 46 by a programmable controller 34.

The controller 34 is connected, via lines 40 to voltage control inputs 41.1–41.4 of rectifiers 30.1–30.4 respectively to set certain output voltages in a manner as will be explained. The controller 34 senses the load bus voltage along line 45.1, the spare bus voltage along line 45.2, the line voltage along line 45.3 and the emergency AC power along line 45.4.

System 2 employs two basic modes of operation. They are:

Normal mode of operation—During normal operation the blocking circuit 36 blocks current from the spare rectifiers 30 from passing onto the load bus 10. This requires that the output voltages of the spare rectifiers 30 are set sufficiently low in magnitude to assure that the diode 38 remains reverse biased.

Fail mode of operation—In case of a failure of a load rectifier 32, the voltage on the load bus 10 drops and one of the spare rectifiers 30, such as 30.1, has its output voltage set to provide supplemental current through the diode 38 to make up for the loss of the failed load rectifier 32. The controller 34 then allows the normally closed relay contacts 44 to close and thus provide a short across the diode 38 and enable the full voltage from the spare rectifier to be made available on the load bus 10 without the voltage drop across diode 38.

The timing diagram of FIG. 3 illustrates how controller 34 responds to successive rectifier failures. Initially controller 34 sets the output voltages of the spare rectifiers as illustrated at time $t_0$, the normal load bus voltage for spare rectifier 30.1 or equal to −52.1V, −51.4 for rectifier 30.2, −42 volts for rectifiers 30.3 and 30.4. These voltages are illustrative and can vary. This renders the spare rectifiers 30.2, 3 and 4 essentially out of the circuit until they are needed, with the level for spare rectifier 30.2 set to avoid dropping the load bus below −51.4V. The load bus 10 voltages are shown on the top of the diagram.

At time $t_1$ the output voltage from the load rectifiers 32 is noted by controller 34 to drop from a normal set level due to a first rectifier failure. The voltage can drop to a level that is determined by the output voltage of spare rectifier 30.1 less the voltage drop across diode 38. The output voltage of rectifier 30.1 is set by controller 34 via line 40.1 at the same voltage as normally is set for the load bus or in this case −52.1V. When the voltage drop across diode 38 is taken into account, the minimum voltage the load bus 10 can thus drop to at time $t_1$ is −51.4 because of the small 0.7V drop across diode 38.

This level remains for load bus 10 until at time t2 controller 34 releases relay 42 and allows its normally closed state to shunt diode 38 with a short and thus directly connect the spare bus 14 to the load bus 10. This in effect enables the load bus voltage to rise to its normal voltage of −52.1V. The spare rectifier 30.2 with its −51.4 output voltage does not affect this. Spare rectifier 30.1 now in effect has become a load rectifier.

When at time t3 another load rectifier 32 fails, the load bus 10 is not permitted to drop below a minimum level because spare rectifier 30.2 was initially set at this minimum level of −51.4V. Hence, at time t3 the load bus drops to a level that is limited to −51.4. At time t4, when controller 34 reacts to the rectifier failure by raising the magnitude of the spare rectifier 30.2's output voltage to −52.1V the load bus 10 resumes its normal output voltage. Spare rectifier 30.2 now has become a load rectifier.

Since, the load bus 10 needs to be protected from dropping below the −51.4V level, the output voltage from spare rectifier 30.3 is also changed at time t4 to −51.4V by controller 34. Then when still another load rectifier fails at time t5 the controller 34 raises the magnitude of the output voltage of spare rectifier 30.3 at time t6 to −52.1V and that of spare rectifier 30.4 to 51.4V.

FIGS. 5A and 5B illustrate a flow diagram 60 for controller 34 to achieve the operational connection of spare rectifiers 30 as described with reference to FIG. 3. At 62 controller 34 monitors the load bus 10 to recognize when the load bus voltage changes indicative of a failure of a load rectifier. This is accomplished by entering values of the voltages sensed on the load bus 10, $VDC_L$, a DC reference voltage $VDC_{REF}$, AC line power 22 $VAC_U$, and emergency AC power $VAC_E$ to the voltage level occurrence and what such changes indicate as actions for the controller 34 to initiate.

A test is then entered at 64 whether the magnitude of the load bus voltage is greater than a predetermined amount set at a level to assure that small load bus voltage variations are not erroneously interpreted as a rectifier failure. If not, there is no failure and the controller operation returns to step 62. If a failure is detected a test is made at 66 whether utility power was lost. If so, then the controller notes at 68 that the batteries are driving the load 4 and turns "off" remaining spare bus rectifiers 30.1–30.4. A message or visual indication on a suitable display is made at 70 and 72 to alert the operator that AC power has failed and that the emergency AC generator will be activated and store the information.

At 74 a test is made whether emergency AC power is available and if so, a return is made to step 62. When AC power from the AC generator 26 turns "on" the load rectifier 32.1–32.4, the controller 34 monitors the load bus voltage and waits until the voltage level is above 51.5 volts. At that time it restores the remaining spare rectifiers to normal operation. If not, an appropriate message to that effect is sent or displayed for the operator at 76.

If the test at 66 indicated that AC line power is available a test is entered at 78 to determine whether this was the first rectifier failure as tested for at 64. If so, the relay contacts 44 are closed at 80 and after a short time delay at 82 a test is made at 84 whether the relay contacts indeed did close. Checking for a voltage difference across the contacts 44 can make such test. If the relay did not close an alert to that effect is sent at 86 together with the display at 88 and storage at 90 that a first rectifier had failed.

In the event the test at 78 indicates that there had been an earlier failure of a load rectifier, then a test is made at 96 whether there had been a third rectifier failure. If so, the voltage of spare rectifier 30.4 is adjusted at 98, a message that there has been a fourth failure of a rectifier is sent at 100 and stored at 102.

Similarly failures of other rectifiers 30.3 and 30.2 are handled as shown in with the steps 104–112 and 114–120 respectively.

With reference to FIG. 6 a system 200 for providing DC power to a system load 204 is shown. A primary DC source 206, using variable load rectifiers as illustrated in FIG. 7, is paralleled with a spare DC source 208. These two DC sources 206 and 208 are segregated from each other via their respective reference voltages. The primary DC source 206 has a fixed reference voltage of −52.1 volts DC and supplies DC power to system load 204 onto a load bus 210 and has a return path through ground bus 212. The spare DC source 208 has a controllable variable reference voltage. The controls 216 adjusts the reference voltage of the spare DC source 208 rectifiers to −51.4 volts DC until a partial or complete failure in the primary DC source 206 occurs. The control 216 is provided to monitor the voltage on load bus 210, the AC line power 222, and the AC power on line 224 from an emergency source 226. A remotely controlled automatic transfer switch 220 enables automatic switching of AC power between the line source 222 and the emergency AC generator power on line 224.

The DC load bus 210 is also connected to a battery system 228, which provides DC power to the load 204 at least for such time as the emergency standby AC power generator 226 requires for start up and the automatic transfer switch 220 can switch to the emergency AC power on line 224. Normally, the battery system 228 is sized to provide DC power for a much longer interval.

The spare DC source 208 is directly connected to the load bus 210 and has it's reference voltages adjusted by the controls 216 to come online in the event of a failure within the primary DC source 206. The primary DC source 206 is sized so as to provide the required DC voltage on load bus 210 throughout the normal current loads imposed by the load 204 and a charging of batteries 228. As a result when an emergency arises, such as when there is partial failure within the DC source 206, and an insufficient amount of DC power is available, the primary DC source 206 becomes more heavily loaded and its output voltage on load bus 210 drops. When this voltage drops to a value of −51.4 volts DC, all spare rectifiers help to share the load 204. This voltage drop is sensed by controls 216, which then adjusts one or more spare rectifiers to an output voltage of −52.1 volts DC until the load bus 210 is restored to −52.1 volts. DC power from the spare DC source 208 is now directly connected to the load bus 210, and the rectifier or rectifiers adjusted to the higher voltage of −52.1 volts DC are considered load rectifiers.

When controls 216 sense a failure in the available line voltage on line 222, DC power from the batteries 228 drives the load 204. The controls 216 effectively turn "off" all spare rectifiers not being used as load rectifiers. The loss of AC line power causes the emergency generator 226 to be activated either by control 226 or manually. The available current from the primary DC source 206 limits the initial current surge demanded by the batteries 228 when the generator 226 comes on line. Since this current capacity has a predetermined limit, the emergency standby AC power generator 222 can be sized to feed this limit and thus satisfy only the primary DC source 206, rather that both the primary DC source 206 and the spare DC source 208.

FIG. 7 depicts interconnections of the primary DC source 206, the spare DC source 208, and the controls 216. The primary DC source 206 and the spare DC source 208 are each formed of a plurality of parallel-connected conventional rectifiers 232 and 230 respectively. FIG. 4 is illustrative of one such rectifier and includes a full wave bridge circuit 35, a filter 37 and a regulator 39. As shown in FIG. 7 the outputs 231.1–231.3 of spare rectifiers 230.1–230.3 are all directly connected to the load bus 210. Once a spare rectifier 230 is activated, such as by raising the magnitude of its output voltage, the spare rectifier 230 will supply power to the load 204 as needed.

The load rectifiers 232.1–232.4 have their outputs 233.1–233.4 connected to load bus 210. Current from the spare rectifiers 230 is supplied to load bus 210 when either a) the controller 234 adjusts the spare rectifier outputs 231.1–231.3 up to the voltage level of the load bus 210, or b) the failure of a load rectifier drops the load bus 210 voltage to the output voltage level of the spare rectifiers.

The controller 234 is connected, via lines 240 to relays 242.1–242.6, each with corresponding sets of contacts 244.1–244.6. The controller operates the relays 242.1–242.6 to control the magnitude of the voltage applied to the voltage control inputs 241.1–241.3 of rectifiers 230.1–230.3. The voltage control inputs 241.1–241.3 of rectifiers 230.1–230.3 set the respective output voltages of the rectifiers. The controller 234 senses the load bus voltage along line 245.1, the line voltage along line 245.2 and the emergency AC power along line 245.3.

System 200 employs two basic modes of operation. They are:

Normal mode of operation—During normal operation the output voltages of the spare rectifiers 230 are set at a −51.4 volt DC level to assure that they are not supplying any current to the load bus 210. The predetermined DC voltage level of the load bus 210 is entirely supported by the load rectifiers 232.

Fail mode of operation—In case of a failure of a load rectifier 232, the voltage on the load bus 210 drops and one or more of the spare rectifiers 230, has its output voltage set at −51.4 volts DC to provide supplemental current to the load bus 210 to make up for the loss of the failed load rectifier 232. The controller 234 then sequentially activates the relays K1–K6, according to the logic programming, to adjust the reference voltage inputs 231.1–231.3 over control lines 241.1–241.3. Closing relay contacts 244.1 effectively shorts out the diode 238.1 and resistor R1 enabling the output voltage from the spare rectifier of −52.1 volts DC to be made available on the load bus 210. This control sequence from the controller 234 is repeated for each spare rectifier 230 each time a load rectifier fails and the load bus 210 voltage drops to the predetermined output level of the next spare rectifier 230.

The forgoing specification described the emergency DC power plant system as utilized with a telecommunications system, however, the invention may be used in any power plant that uses battery back up with a positive or negative ground. The invention has been described with reference to a particular arrangement of parts, features and the like, and are not intended to exhaust all possible arrangements or features, and indeed many other modifications and variations will be ascertainable to those of skill in the art.

What is claimed:

1. A system for supplying uninterrupted DC power to a load to which DC power normally is derived from an AC power source or from an emergency AC power source and a plurality of DC batteries are provided to deliver the DC power to the load when AC power fails to be available, comprising:
    a load bus;
    a bank of load rectifiers connected to said load bus, responsive to AC power from said AC power sources to respectively produce DC power for delivery along said load bus to the load;
    a spare bus;
    a bank of spare rectifiers connected to said spare bus, responsive to said AC power sources to respectively produce DC power for delivery along said spare bus;
    a blocking circuit coupling said spare bus to said load bus so as to enable current to flow from a said spare rectifier through said blocking circuit when the magnitude of the DC voltage on the load bus drops a predetermined amount below that on the spare bus; and
    a controller coupled to sense the voltage on the load bus and from said AC power sources to produce a control signal to enable a spare rectifier upon a failure of a said load rectifier.

2. The system of claim 1 where said blocking circuit comprises:
    a diode, wherein;
        the anode is connected to the load bus and the cathode connected to the spare bus so that the diode will not conduct until the differential voltage developed on the load bus and spare bus rises above the forward bias voltage of said diode;
    a relay, wherein;
        the normally closed contacts of said relay are connected in parallel with said diode, and
        the coil of said relay is connected to said controller to receive a control signal so that upon conduction of the diode, said controller sends a control signal to energize the relay in said blocking circuit which will directly connect the load bus to the spare bus.

3. The system of claim 2 wherein the voltage of the spare bus is offset a fraction of a volt from the load bus voltage so that upon a failure of the relay in said blocking circuit, the controller alerts the user to a relay failure.

4. The system of claim 1 wherein said controller is connected to each spare rectifier wherein a control signal is utilized to adjust the output voltage of each spare rectifier upon a load rectifier failure.

5. The system of claim 4 wherein the controller sequentially adjusts the voltage of a spare rectifier to the desired load bus voltage level in response to a load rectifier failure.

6. The system of claim 1 wherein the controller stores information in memory regarding a rectifier failure.

7. The system of claim 1 wherein the controller stores information in memory regarding the total number of rectifier failures.

8. A system for supplying uninterrupted DC power to a load to which DC power normally is derived from an AC power source or from an emergency AC power source and a plurality of DC batteries are provided to deliver the DC power to the load when AC power fails to be available, comprising:
    a load bus;
    a bank of load rectifiers connected to said load bus, responsive to AC power from said AC power sources to respectively produce DC power for delivery along said load bus to the load;
    a bank of spare rectifiers connected to said load bus, responsive to said AC power sources to respectively produce DC power for delivery along said spare bus;

a reference voltage control circuit coupling said load bus to a reference voltage input of a spare rectifier so as to connect said load bus to said reference voltage input when the magnitude of the DC voltage on the load bus drops a predetermined level; and a controller coupled to sense the voltage on the load bus and from said AC power sources to produce a control signal to enable a spare rectifier upon a failure of a said load rectifier.

9. The system of claim 8 where said reference voltage control circuit comprises:

a diode, a resistor and a first relay and a second relay for each spare rectifier wherein;

the anode of said diode is connected to the reference voltage input of said spare rectifier and the cathode is connected to the resistor so that the diode will not conduct until the voltage developed across the diode rises above the forward bias voltage of said diode;

the normally closed contacts of the first relay are connected in parallel with said diode and the normally closed contacts of the second relay are connected in parallel with said resistor;

the resistor is connected to the cathode of said diode and to the load bus.

10. The system of claim 9 wherein said controller is connected to each the first and the second relay wherein a control signal is utilized to adjust the output voltage of each spare rectifier upon a load rectifier failure.

11. The system of claim 8 wherein the controller sequentially adjusts the voltage of the spare rectifiers to the desired load bus voltage level in response to a load rectifier failure.

12. The system of claim 8 wherein the controller stores information in memory regarding a rectifier failure.

13. The system of claim 8 wherein the controller stores information in memory regarding the total number of rectifier failures.

14. A method for supplying uninterrupted DC power to a load along a load bus to which DC power normally is derived from an AC power source or from an emergency AC power source and a plurality of DC batteries are provided to deliver the DC power to the load when AC power fails to be available comprising the steps of:

providing a bank of rectifiers and segregating the rectifiers into load and spare rectifiers with the load rectifiers connected to the load bus to provide DC power thereto at a desired DC output voltage;

providing a spare bus to which the spare rectifiers are connected and with the spare bus selectively connected to the load bus to provide spare DC power thereto from the spare rectifiers;

adjusting the output voltages of the spare rectifiers so that selected ones are effectively taken off line and at least one of said spare rectifiers has an output voltage that is at a predetermined minimum voltage level for the load bus;

monitoring the load bus so as to detect when a load rectifier has failed;

adjusting the voltage level of the spare rectifiers in accordance with failed load rectifiers to enable a spare rectifier to provide DC power to the load and effectively become a load rectifier.

15. The method of claim 14 further comprising the steps of:

coupling the spare bus to the load bus through a diode and adjusting the voltages on the spare rectifiers so as to assure that the diode is normally reverse biased and becomes forwardly biased when a load rectifier has failed.

16. The method of claim 14 further comprising the steps of:

connecting a controller to each spare rectifier; and sending a control signal from said controller to adjust the output voltages of each spare rectifier in response to a load rectifier failure.

17. The method of claim 16 further comprising the step of sequentially adjusting output voltages of each spare rectifier in response to a load rectifier failure.

* * * * *